Dec. 31, 1929.  J. A. FAGUY  1,741,562

WINDSHIELD AND THE LIKE

Filed Jan. 18, 1928

Inventor:
J. A. Faguy
by E. J. Featherstonhaugh
Attorney.

Patented Dec. 31, 1929

1,741,562

UNITED STATES PATENT OFFICE

JOSEPH AUGUSTIN FAGUY, OF MONTREAL, QUEBEC, CANADA

WINDSHIELD AND THE LIKE

Application filed January 18, 1928. Serial No. 247,687.

The invention relates to windshields, as described in the present specification and illustrated in the accompanying drawings that form part of the same.

The invention consists essentially of the novel features of construction pointed out in the claim for novelty following a description containing an explanation in detail of an acceptable form of the invention.

The objects of the invention are to eliminate many of the accidents, incident to the clouding of the windshield and the consequent interruption of the vision therethrough, particularly during the winter season; to utilize the electric energy convenient in motor driven vehicles, in maintaining the glass clear of frost in front of the driver; to increase the strength of the glass and thereby insure greater safety for the occupants of a vehicle in collision with another vehicle; and generally to provide in a very simple construction a safety device that will not add materially to the cost of the vehicle, nor will it in any way inconvenience the owner or operator.

In the drawings, Figure 1 is an elevation of a windshield, showing the invention applied thereto.

Like numerals of reference indicate corresponding parts in the various figures.

Figure 1:
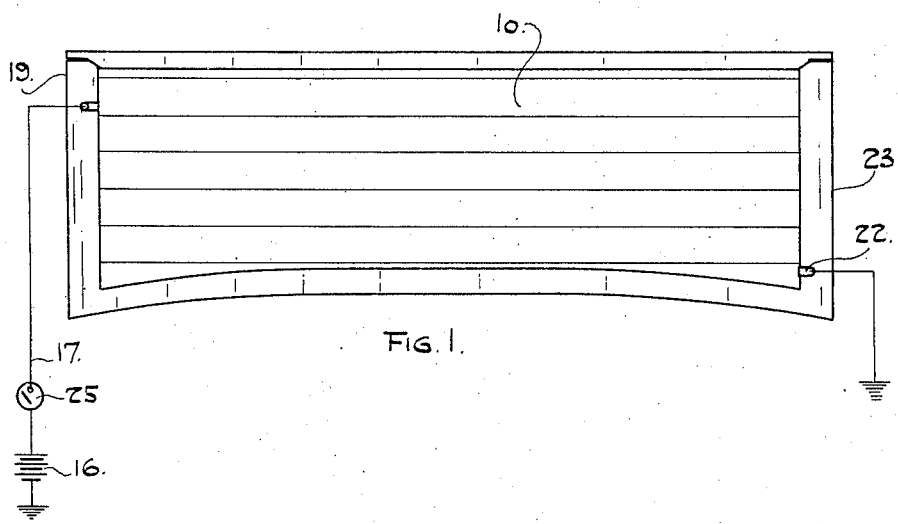
Figure 2:
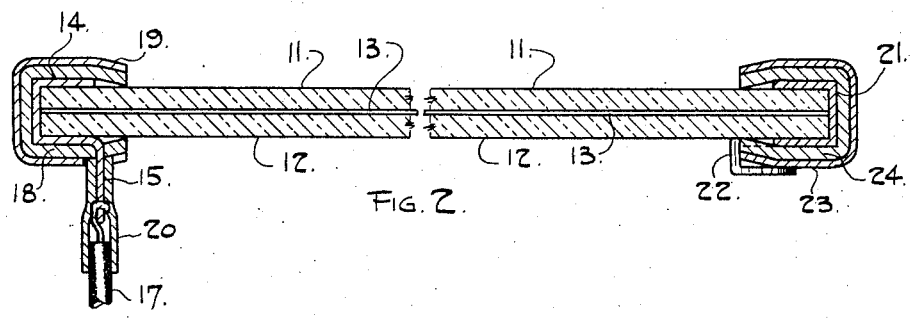
Figure 2 is a longitudinal sectional view of the windshield, showing the electrical connections to the interstrung wires.

Referring to the drawings, the numeral 10 indicates a composite windshield formed of the outer and inner sheets of glass 11 and 12 and longitudinally strung parallel wires 13 in between the two sheets of glass, these sheets of glass being bound together at one end by the strip of copper 14 to which the several wires are welded at the ends or secured in any other suitable manner.

The binding 14 has a lug 15 projecting therefrom, and inwardly into the vehicle, and this lug forms a binding post which is connected to the battery 16 by the wiring 17.

The binding 14 is closed in by the insulation 18 and this again is covered by the windshield frame 19 which is usually of metal.

The post 15 projects inwardly through the insulation and through the frame 19 and is again insulated from the frame by the rubber cap 20.

The wires 13 are interstrung in the windshield and as before mentioned are parallel or substantially parallel, as it is easier for the eyes and better for driving to have them regular throughout.

These wires may or may not be imbedded in a substance adapted to hold the sheets of glass together for the glass sheets are often made this way, that is to say, a kind of compound glass is commonly made of two or more layers, usually two, held together by a composition of suitable transparent adhesive, used for that work, but glass of that style is not always satisfactory, as it sometimes turns yellow.

The interstrung wires may be inserted between two sheets held together at the edges, by other ways than described and accomplish the same purpose, namely heating the two sheets of glass and melting away any accumulation of frost.

The other end of the glass sheets are preferably bound by the strip of copper 21, from which the lug 22 extends being bent back and secured to the metal frame 23 of the windshield. The insulation 24 is introduced between the frame 23 and the binding strip 21, and the said binding strip 21 is welded or otherwise secured to the wires 13 and as this binding is connected from the lug 22 with the ground, the circuit is completed through the several interstrung wires from the source of energy.

The electric switch 25 is introduced in the connections from the binding post 15 to the battery and this switch is well within the reach of the driver, so that the current can be turned on to the wires in the glass at any time and thereby thoroughly warm the two sheets and just keep them comfortably warm to avoid any accumulation of frost, due to the exposure of the windshield in frosty weather.

Figure 4:
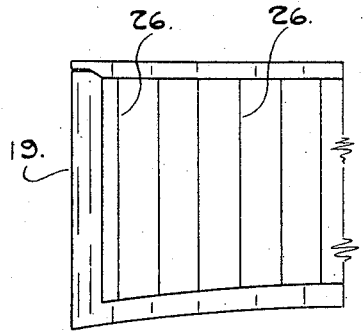
Figure 4 is a plan view showing another arrangement in stringing the wires.
Figure 3:
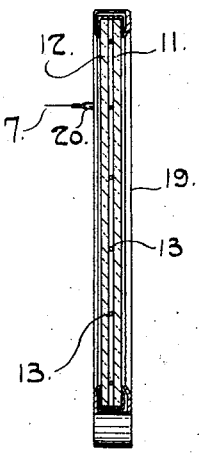
Figure 3 is a vertical sectional view of the windshield.

In Figure 4 the wires 26 are arranged vertically and are interstrung between the glass sheets in front of the driver.

These wires have exactly the same connections, that is to say, binding strips, binding post and connector lug, in fact it is exactly the same construction, except as to the direction of the wires.

There may be other means of introducing these wires to the glass, such as has been done in moulding operations, that is to say, before the moulding of the glass, the wires are laid across the mould, and connections made later from the projecting ends, but the double sheets of glass offer extra protection to the driver, and it has been found that when they are securely fastened together, the fracture of the glass through collisions or otherwise, is not liable to break into pieces, in fact it is very difficult to smash it, and as this glass is also reinforced by the wires, the latter become a factor of safety.

What I claim as my invention is:—

In a windshield, a heater formed of inwardly flanged copper strips having offset lugs projecting therefrom and spaced parallel wires centrally welded thereto, glass panes introduced in said flanges and covering said wires on the inner and outer sides, an electric terminal secured to one of said lugs and a metal frame enclosing said flanged strips and insulated therefrom and connected to the other lug.

Signed at Montreal, Canada, this 2nd day of December 1927.

JOSEPH AUGUSTIN FAGUY.